United States Patent
Morita et al.

(10) Patent No.: US 6,492,042 B2
(45) Date of Patent: Dec. 10, 2002

(54) CERAMICS MATERIAL AND PRODUCING THE SAME

(75) Inventors: Keiji Morita, Chiba (JP); Mitsuhiro Fujita, Chiba (JP); Haruo Murayama, Chiba (JP)

(73) Assignee: Toshiba Ceramics Co., Ltd., Tokyo (JP)

( * ) Notice: Subject to any disclaimer, the term of this patent is extended or adjusted under 35 U.S.C. 154(b) by 0 days.

(21) Appl. No.: 09/901,070

(22) Filed: Jul. 10, 2001

(65) Prior Publication Data

US 2002/0012791 A1 Jan. 31, 2002

(30) Foreign Application Priority Data

Jul. 10, 2000 (JP) .......................................... 2000-207984
May 25, 2001 (JP) .......................................... 2001-156774

(51) Int. Cl.$^7$ ................................................. B32B 9/00
(52) U.S. Cl. ....................... 428/697; 428/699; 428/701; 428/702; 428/426; 428/432; 501/41; 501/153; 264/653; 264/654; 264/658

(58) Field of Search ................................. 428/689, 699, 428/702, 701; 501/152, 153; 264/653, 654, 658

(56) References Cited

U.S. PATENT DOCUMENTS 6,383,964 B1 * 5/2002 Nakahara et al. ........... 501/105

FOREIGN PATENT DOCUMENTS

JP            10-236871        9/1998

* cited by examiner

Primary Examiner—Deborah Jones
Assistant Examiner—Arden B. Sperty
(74) Attorney, Agent, or Firm—Foley & Lardner

(57) ABSTRACT

The invention is a method of producing a ceramics material comprising the steps of: preparing a raw powder in which alumina particles having an average particle diameter of 0.1–1.0 μare doped with at least magnesia of 0.01–1 weight % and a solution containing yttrium of 0.1–15 weight % in yttria; molding said raw powder and calcining a molding thus created; and heating the calcined molding in an atmosphere containing a hydrogen gas to create YAG which is leached to the surface to deposit YAG on the surface and sintering the molding.

21 Claims, 2 Drawing Sheets

CERAMICS MATERIAL AND PRODUCING THE SAME

BACKGROUND OF THE INVENTION

1. Field of the Invention

This invention relates to a ceramics material (or member) and a method of producing it, and more particularly to a ceramics material that shows an excellent plasma-resistant property in an atmosphere of a halogen corrosive gas and also excellent mechanical property, and a method of producing it.

2. Description of the Related Art

Generally, a process of manufacturing a semiconductor device uses an etching apparatus or sputtering apparatus for subjecting a semiconductor wafer to micromachining, or a CVD apparatus for depositing a film on the semiconductor wafer. These apparatus are provided with a plasma generating mechanism for the purpose of high integration. For example, a helicon wave plasma etching device whose schematic is shown in FIG. 2 is known.

In FIG. 2, reference numeral 1 denotes a processing chamber which is provided with an antenna 2, an electromagnet 3 and a permanent magnet 4 on the periphery. The processing chamber 1 includes an etching gas supplying inlet 5 and a vacuum discharge outlet 6, and also a lower electrode 8 for supporting a semiconductor wafer, which is installed within the chamber. The antenna 2 is connected to a first high frequency power source 10 through a first matching network 9 and connected to a second high frequency power source 12 through a matching network.

Etching by the etching apparatus described above will be carried out as follows. First, with the semiconductor wafer 7 placed on the lower electrode 8, after the interior of the processing chamber 1 has been evacuated, an etching gas is supplied. Next, the antenna 2 and lower electrode 8 are supplied with high-frequency currents at a frequency of 13.56 MHz from the high frequency power sources 10 and 12 through the corresponding matching networks 9 and 11. On the other hand, the electromagnet 3 is also supplied with a current so that a high density plasma is generated within the processing chamber. The plasma energy thus formed decomposes the above etching gas in an atomic state. Thus, the film formed on the upper surface of the semiconductor wafer is etched.

Meanwhile, these apparatus uses as an etching gas a corrosive gas such as a chloric gas inclusive of boron chloride ($BCl_3$) or carbon fluoride ($CF_4$). Therefore, the members exposed to plasma in the atmosphere of the corrosive gas, such as an inner wall of the processing chamber 1, a monitoring window, a microwave introducing window and a lower electrode 8 are required to have a plasma-resistant property. In order to satisfy the above requirement, a ceramics material such as a sintered body of alumina, of sodium nitride, of aluminum nitride, etc. has been used as the plasma resistant material.

However, the ceramics material such as the sintered body of alumina, of sodium nitride, of aluminum nitride, etc. gradually corrodes when it is exposed to the plasma in the atmosphere of the corrosive gas. As a result, the crystal particles constituting the surface are separated so that "particle pollution" is produced. Specifically, the separated particles deposited on the semiconductor wafer 7 and the lower electrode 8 adversely affect the quality and accuracy of the deposited film. This presents a problem of deteriorating the performance and reliability of the semiconductor device.

In the CVD apparatus also, since the above ceramics material is exposed to a fluorine gas such as fluorine nitride ($NF_3$) under the plasma during the cleaning, it is required to have corrosion resistance.

In order to obviate the problem of corrosion resistance, a ceramics material containing a sintered body of yttrium-aluminum-garnet (YAG) as a raw material has been proposed (JP-A-10-236871). Namely, the proposed ceramics material is a material in which the surface exposed to the plasma in the atmosphere of a halogenic corrosive gas is formed of the sintered body of YAG and has a center line average height (Ra) of 1 $\mu$m or less.

However, the sintered body of YAG is excellent in the plasma resistance, but inferior in the mechanical property such as bending strength and breakage toughness. The inferior mechanical property (e.g. fragileness) means that the material is apt to be damaged or broken during a process of cleaning. Being coupled with relative high cost of the material itself, this leads to an increase in the production cost of the manufacturing apparatus or semiconductor.

SUMMARY OF THE INVENTION

This invention has been accomplished under the above circumstance, and intends to provide a low-cost ceramics material which has high plasma resistance and is also excellent in the mechanical property such as bending strength and breakage toughness, and a method of producing it.

The first aspect of this invention is a ceramics material characterized by comprising a base material substantially made of a sintered body of alumina and a yttrium-aluminum-garnet(YAG) layer having a thickness of 2 $\mu$m or more which is formed on a surface of the base material.

A ceramics material according to the second aspect of this invention, is characterized in that the surface of the base material is covered with the YAG layer so that alumina crystalline particles in the sintered body of alumina are not exposed.

A ceramics material according to the third aspect of this invention is characterized in that the YAG layer has a thickness of 150 $\mu$m or less.

A ceramics material according to the fourth aspect of this invention is characterized in that the base material is a sintered body of alumina with an amount of YAG which increases gradually from the interior to the surface.

A ceramics material according to the fifth aspect of this invention is characterized in that an amount of YAG within the sintered body of alumina is 5 weight % or less.

A ceramics material according to the sixth aspect of this invention is characterized in that the alumina crystalline particles in the sintered body of alumina have an average crystalline diameter of 200 $\mu$m.

The seventh aspect of this invention is a method of producing a ceramics material comprising the steps of:

preparing a raw powder in which alumina particles having an average particle diameter of 0.1–1.0 $\mu$m are mixed with at least a magnesium compound of 0.01–1 weight % in magnesia and an yttrium compound of 0.1–15 weight % in yttria;

molding the raw powder and calcining a molding thus formed; and heating the molding in an atmosphere containing a hydrogen gas to form YAG which is exuded to the surface to deposit YAG on the surface and sintering the molding.

The eighth aspect of this invention is characterized in that a solution of yttrium is added as a component of the raw powder after the molding has been calcined.

The ninth aspect of this invention is characterized in that a layer of YAG exuded to and deposited on the surface of the sintered molding is heated so that it is densified.

The tenth aspect of this invention producingis characterized in that a layer of YAG exuded to and deposited on the surface of the sintered molding is heated so that it is molten, and solidified again.

The eleventh aspect of this invention is a method of producing a ceramics material, characterized in that a powder layer, molding or a calcined body of YAG is laminated on a molding or a calcined body of alumina containing magnesium and yttrium and is heated in an atmosphere of a hydrogen gas.

The twelfth aspect of this invention is a method of producing a ceramics material, characterized in that a powder layer, molding or a calcined body of YAG is laminated on the surface of a sintered body with a YAG layer deposited thereon and is heated in an atmosphere of a hydrogen gas so that it is sintered.

In these aspects of this invention, it seems that the surface of the base material of alumina substantially made of a sintered body of alumina is covered with the YAG layer through its exuding for the following matters. The yttrium component which resides on the surface of the alumina raw particle is deformed into YAG through heating, and the boundary among the alumina particles is decreased owing to the growth of the alumina particle. As a result, the YAG cannot reside at the center of the sintered body of alumina so that the major amount of it gradually move to the surface of the sintered body.

In this inventions, the YAG layer covering the surface of the base material of alumina is required to have a thickness of 2 $\mu$m or more. Specifically, where the thickness is shorter than 2 $\mu$m required plasma resistance cannot be given. Further, the surface of the base material of alumina is preferably covered with the YAG layer so that the base material of alumina is not exposed to the surface. Where the base material of alumina is exposed, when the YAG layer is exposed to plasma in an atmosphere of a corrosive gas, the exposed portion of the base material will partially corrode so that fine particles are apt to occur. Furthermore, the thickness of the YAG layer is preferably not greater than 150 $\mu$m. The thickness exceeding 150 $\mu$m does not provide an improvement of the effect, but is a hindrance of low production cost.

The base material substantially made of a sintered body of alumina means that the main component of the base material is the sintered body of alumina. Particularly, it is preferably the sintered body in which the composition of alumina is 85 weight % or more. Further, where the YAG layer is formed as a coating through breaching when the alumina is sintered, the ceramics material can exhibit plasma resistance and a mechanical property.

In the structure in which the surface of the base material of alumina is covered with the YAG layer, where the base material of alumina is a sintered body of alumina with an amount of YAG which increases gradually from the interior to the surface, a difference in the thermal expansion coefficient between the base material of alumina and YAG layer is reduced. Therefore, a ceramics material with improved separation resistance during the heating cycle is provided.

The amount of YAG in the interior of the sintered body of alumina is preferably 5 weight % or less in order to provide the ceramics material with higher breakage toughness, more preferably 3 weight % or less. In the case of the ceramics material of which the entire outer surface is covered with the YAG layer, the interior of the base material of alumina refers to the vicinity of center of gravity. Incidentally, the member which is obtained by optionally cutting the ceramics material with the entire outer surface covered with the YAG layer in order to give plasma resistance to a specific plane of the base material should be also included in the category of the ceramics material herein referred to.

The average particle diameter of the sintered crystal in the base material of alumina (sintered body of alumina) is preferably 200 $\mu$m or less, more preferably 5–200 $\mu$m, and much preferably 10–40$\mu$m. If the average particle diameter exceeds 200 $\mu$m, it is difficult to disperse uniformly gradually the amount of YAG which increases gradually from the interior of the sintered body of alumina to the surface. Namely, YAG is apt to reside locally. This make it difficult to provide higher separation resistance during the heating cycle of the YAG layer. The particle diameter is a value measured by the planimetric technique.

In the sintering step of the ceramics material, where the YAG layer is formed through exuding on the surface of the base material of alumina, magnesia (which can be replaced by the hydrate of magnesium sulfate and magnesium nitrate) of 0.01–1 weight % is preferably added to control the growth of crystalline particles.

The ceramics material in this invention can be produced by the method defined in this invention. Generally, a raw powder is prepared in which alumina particles having an average particle diameter of 0.1–1.0 $\mu$m are mixed with at least a magnesium compound of 0.01–1 weight % in magnesia and an yttrium compound of 0.1–15 weight % in yttria.

After the raw powder has been granulated, it is molded by e.g. hydrostatic pressure press, and the molding thus formed is subjected to calcination processing. The molding thus obtained is heated in an atmosphere containing a hydrogen gas to form YAG which is exuded to the surface through the grain growth of alumina to make a YAG film. The molding is further sintered to provide a desired ceramics easily.

Incidentally, the granulated raw power may be molded by not the hydrostatic pressure press but may be molded by other molding means such as extrusion, injection molding, casting, etc. Further, when the raw powder may be prepared, in place of making particles as the solution containing yttrium, yttrium or its compound particles (powder) is added/mixed as long as it can be uniformly scattered.

The average particle diameter of the alumina particle which is the main component of the raw powder is preferably selected in a range of 0.1–1.0 $\mu$m. This is because the crystalline particle of alumina makes abnormal growth during a final sintering step, which may ruin the exuding of YAG to the surface and its deposition.

The addition of magnesia is done in order to control appropriately the crystalline particles of the sintered body which is the base material having the alumina as a main component. The composition ratio is selected in a range of 0.01–1 weight %. Incidentally, the composition of magnesia to be added/mixed may be a magnesium compound which is deformed into magnesia by heating such as magnesium sulfate, magnesium nitrate, etc. In this case, its adding/mixing amount should be selected in a range of 0.01–1 weight %.

The addition of the solution containing yttrium is efficient to generate required YAG which is exuded to and deposited on the surface of the sintered body of alumina and improve plasma-resistance. It is selected to be 0.1–15 weight % in yttria. It should be noted that the solution containing yttrium is obtained by dissolving one or two or more of yttrium acetate, yttrium chloride, or their hydrate in pure water, alcohol, etc.

In this invention, the raw powder containing the alumina particles as a main component is mixed/stirred with magnesia, yttrium composition, binder resin and medium solution to prepare a slurry. This is carried out using e.g. a rotary ball milling. The slurry thus prepared is granulated using e.g. a spray drier. The granulated powder is molded by an ordinary pressuring molding such as hydrostatic press, extrusion, injection molding, or casting.

The molding of the granulated powder is calcined at a temperature of 600–1300° C. under an atmospheric pressure. The temperature and time of the calcination is determined according to the shape and size of the molding. The sintering after the calcination is carried out at a temperature of 1700–1850° C. in an atmosphere containing a hydrogen gas such as a hydrogen current.

In this case, in order to form YAG more smoothly and advance its exuding to and deposition on the surface while suppressing the abrupt growth of crystal particles, the temperature rising speed is selected and set at a slightly slow speed, or the sintering time is set at a longer time.

In this invention, the YAG formed during the calcination and sintering step and exuded and deposited on the surface is heated for the purpose of densifying by the YAG layer. Specifically, where the YAG film exuded to and deposited on the surface of the sintered body is thin or coarse, it is heated at the temperature of e.g. 1700° C.–1850° C. Thus, the YAG exuded to and deposited on the surface is softened and dissolved again, thereby improving plasma-resistance.

The ceramics material can be produced in the following process. In this invention, a molding or a calcined body of alumina containing magnesium and yttrium is prepared, and a powder layer, molding or a calcined body of YAG is laminated on the surface of the molding or calcined body thus prepared. The laminated body is heated in an atmosphere of a hydrogen gas so that it is sintered. Otherwise, a powder layer, molding or a calcined body of YAG is laminated on the surface of the sintered body with a YAG layer deposited thereon. The laminated body is heated in an atmosphere of a hydrogen gas so that it is sintered.

In this inventions, a structure is adopted in which a base material is substantially made of an sintered body of alumina and the surface thereof is covered with a YAG layer. Specifically, the structure is adopted in which the base material is made of an sintered body of alumina with an excellent mechanical property such as bending strength and breakage toughness while the surface exposed to plasma is covered with the YAG layer with excellent plasma-resistance.

Where the base material is an sintered body of alumina with an amount of YAG which increases gradually from the interior to the surface, it exhibits high heat-resistance. The coverage of the YAG layer improves the plasma resistance of the ceramics material, and cancels the occurrence of damage/breakage during the cleaning. Thus, the ceramics material which is free from the fear of particle contamination and has excellent heating-cycle resistance can be acquired.

Therefore, this invention suppresses the increase in the production cost of a producing apparatus and semiconductor and also efficiently contributes to the production/processing of the semiconductor with high performance and reliability without adversely affecting the quality and accuracy of the deposited film.

This invention can provide, with high yield and in mass production, a ceramics material in which the base material is made of a sintered body of alumina with an excellent mechanical property such as bending strength and breakage toughness while the surface exposed to plasma is covered with the YAG layer with excellent plasma-resistance. Particularly, this invention can easily adopt the structure in which the YAG is exuded to and deposited on the surface of the base material of the sintered body of alumina with an amount of YAG which increases gradually from the interior to the surface, and so can provide a ceramics material with excellent thermal shock resistance.

DESCRIPTION OF THE PREFERRED EMBODIMENTS

Figure 1:
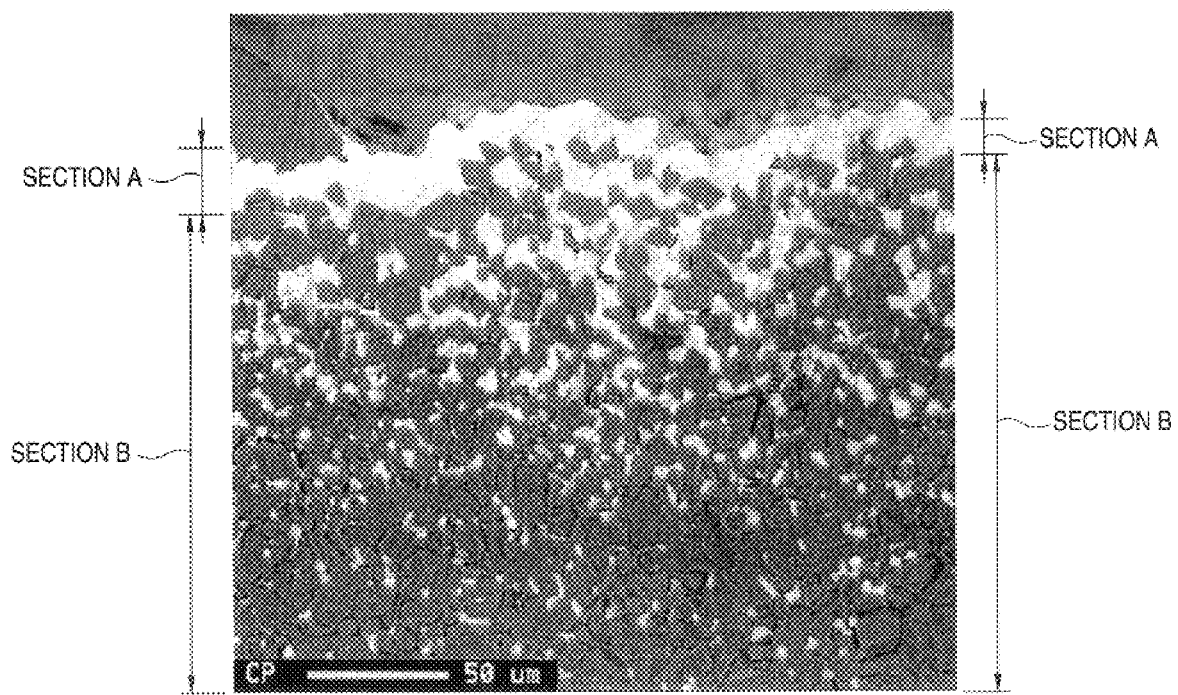
FIG. 1 shows a reflected electronic image of a cut plane of a plasma-resistant material according to an embodiment of this invention.
Figure 2:
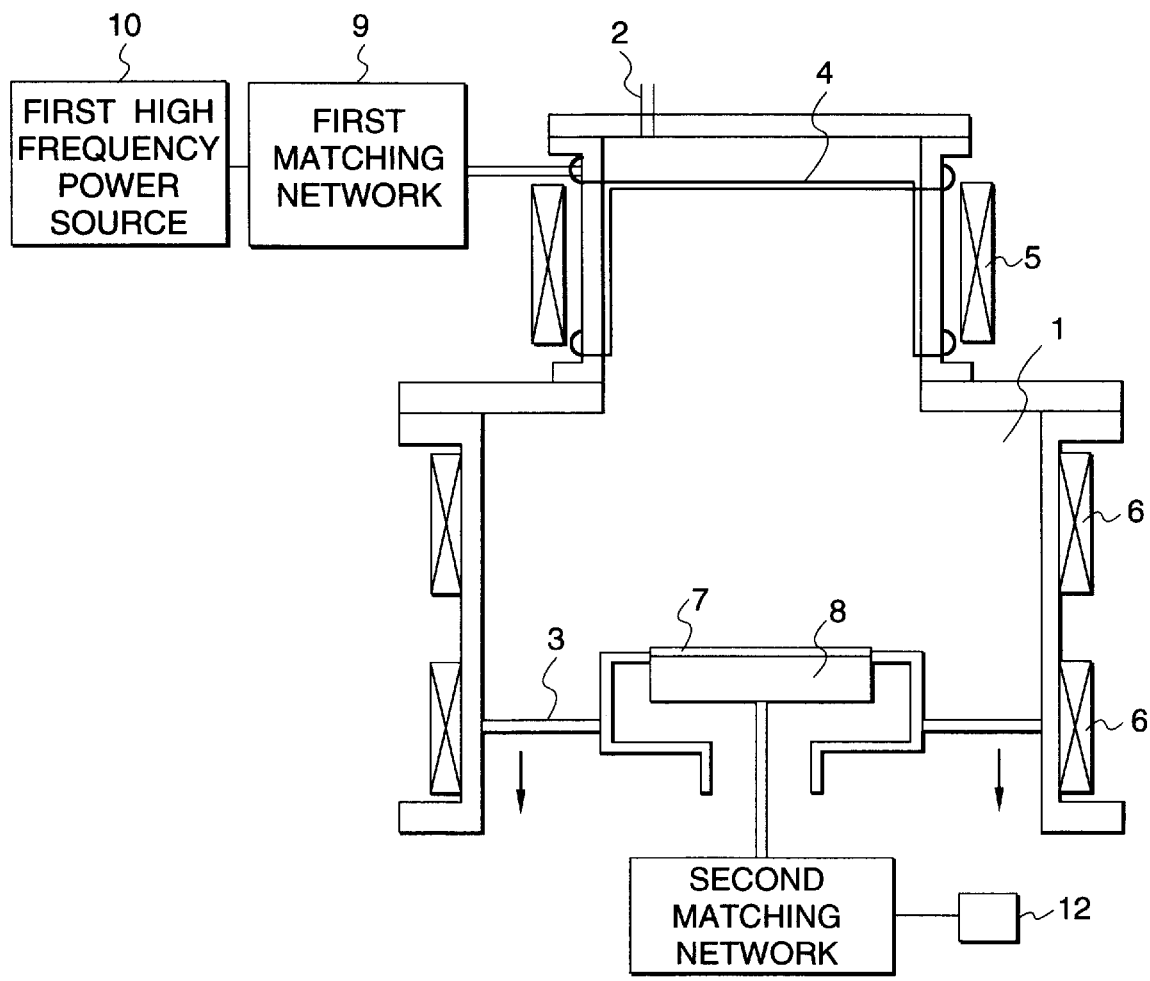
FIG. 2 shows a sectional view of a schematic configuration of a CVD apparatus.

Referring to FIG. 1, an explanation will be given of various embodiments of this invention.

Embodiment 1

An appropriate amount of ion-exchanging water and 2 parts of polyvinyl alcohol were added to a composition system of $MgSO_4.7H_2O$ of 750 ppm in magnesia and $Y(CH_3COO)_3.4H_2O$ of 1.5 weight parts in yttria for 100 weight parts of alumina particles having an average particle diameter of 0.3μm. The solution is stirred to mix these components, thereby preparing a slurry. The slurry is granulated using a spray drier. The granulated powder was molded under the pressure of 10 MPa using hydrostatic pressure press (CIP) into a molding having a thickness of 10 mm and a width of 100 mm and a length of 100 mm.

The molding was calcined at the temperature of 900° C. in the air and sintered at the temperature of 1790° C. in an atmosphere of a hydrogen gas, thereby making a ceramics material. The ceramics material was identified by the X-ray diffraction (XRD). As a result, YAG other than alumina existed on the surface and in the interior of the sintered body (ceramics material).

As a result of observation/image pick-up of a section of the sintered body by an electron microscope, as seen from an inverted electronic image shown in FIG. 1, it was confirmed that the sintered body at issue is the ceramics material with the entire surface of the base material which is substantially made of the sintered body of alumina is covered with the YAG layer. In FIG. 1, a white portion represents a particle layer of YAG crystal, and a black portion represents alumina crystal particles. Section A denotes the YAG layer and section B denotes the base material substantially made of the sintered body of alumina.

Incidentally, it was confirmed that the amount of YAG increases gradually from the interior (lower portion) of the base material to the surface (upper portion). It was also confirmed that the surface of the base material is covered with the YAG layer having a thickness of 20–30 μm so that the exposed portion of the alumina crystal particles (sintered body) do exist on the surface.

The average particle diameter of the alumina crystal particles measured for the above inverted electronic image by the planimetric technique was 20 μm. Further, the material cut out from the interior of the base material (center portion) was subjected to ICP light emission analysis to measure the amount of YAG. The result was 0 weight %.

The sample pieces of 10×10 mm square were cut out from the above sintered body and their breakage toughness were measured by the IF method using a Vickers indenter. The result was 4.0 $MPa.m^{1/2}$ which is approximately equal to the breakage toughness of the sintered body of alumina. The three-point bending strength measured for these samples was 350 MPa. Incidentally, the sintered body of YAG, which has a breakage toughness of 1–2MPa.m$^{1/2}$ and a three-point bending strength of 200–300 MPa, is fragile.

The sample pieces with the one side being the surface of the sintered body itself having a thickness of 2 mm and an area of 10×10 mm square were cut out from the above sinter and attached to a parallel plate type RIE apparatus. The sample pieces were subjected to a plasma exposure test under the condition of a frequency of 13.56 MHz, a high frequency source of 500, a high frequency bias of 300 W, $CF_4/O_2/Ar=30:20:50$, and a gas pressure of 0.6665 Pa (5 m Torr). The result of etching rate (nm/Hr) was 1 or less.

Ten sample pieces with the one side being the surface of the sintered body itself having a thickness of 2 mm and an area of 20×20 mm square were cut out from the above sintered body. These samples were subjected to 100 times of heat cycles in which they are held for ten minutes in an air furnace kept at 400° C. and taken out to the furnace and cooled down to the room temperature. As a result of the heat cycles, it was confirmed that the layer of YAG layer has not been separated. In other words, because the dense YAG layer on the surface and the base material of alumina are integrated through a portion with the amount of YAG which increases gradually from the interior of the base material of alumina to the surface, the above samples exhibit excellent heat cycle resistance. The excellent heat cycle resistance means sufficient endurance to the heat cycle by e.g. plasma radiation.

Embodiment 2

An appropriate amount of ion-exchanging water and 2 parts of polyvinyl alcohol were added to a composition system of $MgSO_4.7H_2O$ of 750 ppm in magnesia and $Y(CH_3COO)_3.4H_2O$ of 3 weight parts in yttria for 100 weight parts of alumina particles having an average particle diameter of 0.3 $\mu$pm. The solution is stirred to mix these components, thereby preparing four kinds of slurries. Each slurry is granulated using a spray drier. The granulated powder is molded under the pressure of 100 MPa using hydrostatic pressure press (CIP) into a molding having a thickness of 10 mm and a width of 100 mm and a length of 100 mm.

The molding was calcined at the temperature of 900° C. in the air and sintered at the temperature of 1790° C. in an atmosphere of a hydrogen gas, thereby making a ceramics material. The ceramics material was identified by the X-ray diffraction (XRD). As a result, it was confirmed YAG other than alumina exists on the surface and in the interior of the sintered body(ceramics material). Specifically, as a result of observation/image pick-up of a section of the sintered body by an electron microscope, as in the case of the first embodiment, it was confirmed that the sintered body at issue is the ceramics material with the entire surface of the base material which is substantially made of the sintered body of alumina is covered with the YAG layer.

As regards the ceramics material, it is confirmed that the amount of YAG increases gradually from the interior Lower portion) of the base material to the surface (upper portion). It was also confirmed that the surface of the base material is covered with the YAG layer having a thickness of 20–70 $\mu$m so that the exposed portion of the alumina crystal particles (sintered body) do exist on the surface.

The average particle diameter of the alumina crystal particles measured for the above inverted electronic image by the planimetric technique was 20 $\mu$m. Further, the material cut out from the interior of the base material (center portion) was subjected to ICP light emission analysis to measure the amount of YAG. The result was 0.5 weight %.

The sample piece of 10×10 mm square was cut out from the above sintered body and its breakage toughness was measured by the IF method using a Vickers indenter. The result was 3.9 MPa.m$^{1/2}$ which is approximately equal to the breakage toughness of the sintered body of alumina. The three-point bending strength measured for these samples was 340 MPa.

The sample pieces with the one side being the surface of the sintered body itself having a thickness of 2 mm and an area of 10×10 mm square were cut out from the above sintered body and were subjected to a plasma exposure test under the same condition as in the first embodiment. The result of etching rate (nm/Hr) was 1 or less for any sample. Further, ten sample pieces with the one side being the surface of the sintered body itself having a thickness of 2 mm and an area of 20×20 mm square were cut out from the above sintered body. These samples were subjected to 100 times of heat cycles in which they are held for ten minutes in an air furnace kept at 400° C. and taken out to the furnace and cooled down to the room temperature. As a result of the heat cycles, it was confirmed that the layer of YAG layer has not been separated.

In other words, because the dense YAG layer on the surface and the base material of alumina are integrated through a portion with the amount of YAG which increases gradually from the interior of the base material of alumina to the surface, the above samples exhibited excellent heat cycle resistance.

Embodiment 3

An appropriate amount of ion-exchanging water and 2 parts of polyvinyl alcohol were added to a composition system of 0.1 weight part of silica particles having an average particle diameter of 0.3 $\mu$m, $MgSO_4.7H_2O$ of 750 ppm in magnesia and $Y(CH_3COO)_3.4H_2O$ of 5.0 weight parts in yttria for 100 weight parts of alumina particles having an average particle diameter of 0.3 $\mu$m. The solution was stirred to mix these components, thereby preparing a slurry. The slurry was granulated using a spray drier. The granulated powder was molded under the pressure of 100 MPa using hydrostatic pressure press (CIP) into a molding having a thickness of 10 mm and a width of 100 mm and a length of 100 mm.

The molding was calcined at the temperature of 900° C. in the air and sintered at the temperature of 1790° C. in an atmosphere of a hydrogen gas, thereby making a ceramics material. The ceramics material was identified by the X-ray diffraction (XRD). As a result, it was confirmed that YAG other than alumina exists on the surface and in the interior of the sintered body (ceramics material). Specifically, as a result of observation/image pick-up of a section of the sintered body by an electron microscope, as in the case of the first embodiment, it was confirmed that the sintered body at issue is the ceramics material with the entire surface of the base material which is substantially made of the sintered body of alumina is covered with the YAG layer.

Incidentally, it was confirmed that the amount of YAG increases gradually from the interior (lower portion) of the base material to the surface (upper portion). It was also confirmed that the surface of the base material is covered with the YAG layer having a thickness of 5–50 $\mu$m so that the exposed portion of the alumina crystal particles (sintered body) do exist on the surface.

The average particle diameter of the alumina crystal particles measured for the above inverted electronic image by the planimetric technique was 20 $\mu$m. Further, the material cut out from the interior of the base material (center portion) was subjected to ICP light emission analysis to measure the amount of YAG. The measured amount was 0.8 weight %.

The sample pieces of 10×10 mm square were cut out from the above sintered body and their breakage toughness were measured by the IF method using a Vickers indenter. The result was 3.9 MPa.m$^{1/2}$ which is approximately equal to the breakage toughness of the sintered body of alumina. The three-point bending strength measured for these samples was 340 MPa.

The sample pieces with the one side being the surface of the sintered body itself having a thickness of 2 mm and an area of 10×10 mm square were cut out from the above sintered body, and were subjected to a plasma exposure test under the same condition as in the first embodiment. The result of etching rate (nm/Hr) was 1 or less for any sample. Further, ten sample pieces with the one side being the surface of the sintered body itself having a thickness of 2 mm and an area of 20×20 mm square were cut out from the above sintered body and subjected to 100 times of heat cycles under the same condition as in the first embodiment. As a result, it was confirmed that the layer of YAG layer has not been separated.

In other words, because the dense YAG layer on the surface and the base material of alumina are integrated through a portion with the amount of YAG which increases gradually from the interior of the base material of alumina to the surface, the above samples exhibit excellent heat cycle resistance.

Embodiment 4

An appropriate amount of ion-exchanging water and 2 parts of polyvinyl alcohol were added to a composition system of MgSO$_4$.7H$_2$O of 750 ppm in magnesia for 100 weight parts of alumina particles having an average particle diameter of 0.03 μm. The solution was stirred to mix these components, thereby perparing a slurry. The slurry is granulated using a spray drier. The granulated powder was molded under the pressure of 10 MPA using hydrostatic pressure press (CIP) into a molding having a thickness of 10 mm and a width of 100 mm and a length of 100 mm. On the other hand, an appropriate amount of ion-exchanging water was added to a composition system of 0.5 weight part of a dispersing agent of polycarboxylic acid ammonium for 100 weight parts of alumina particles having an average particle diameter of 0.8 μm. The solution was stirred to mix the above components, thereby preparing another slurry.

The above YAG slurry was applied to the entire surface of the molding of alumina. The molding was dried in a drier at the temperature of 40° C. The molding was calcined at the temperature of 900° C. and sintered at the temperature of 1790° C. in an atmosphere of a hydrogen gas, thereby making a ceramics material.

The ceramics material was identified by the X-ray diffraction (XRD). As a result, it was confirmed that YAG other than alumina does not exist on the surface and in the interior of the sintered body (ceramics material). Specifically, as a result of observation/image pick-up of a section of the sintered body by an electron microscope, it was confirmed that the sintered body at issue is the ceramics material with the entire surface of the base material which is substantially made of the sintered body of alumina is covered with the YAG layer having a thickness of 20–30 μm.

The average particle diameter of the alumina crystal particles measured for the above inverted electronic image by the planimetric technique was 20 μm. Further, the material cut out from the interior of the base material (center portion) was subjected to ICP light emission analysis to measure the amount of YAG. The result was 0 weight %.

The sample pieces of 10×10 mm square were cut out from the above sintered body and their breakage toughness were measured by the IF method using a Vickers indenter. The result was 4.1 MPa.m$^{1/2}$ which is approximately equal to the breakage toughness of the sintered body of alumina. The three-point bending strength measured for these samples was 360 MPa.

The sample pieces with the one side being the surface of the sintered body itself having a thickness of 2 mm and an area of 10×10 mm square were cut out from the above sintered body and were subjected to a plasma exposure test under the same condition as that in the first embodiment The result of etching rate (nm/Hr) was 1 or less. Further, ten sample pieces with the one side being the surface of the sintered body itself having a thickness of 2 mm and an area of 20×20 mm square were cut out from the above sintered body. These samples were subjected to the heat cycle test under the same condition as in the first embodiment. Before the number of the heat cycles reaches 100 times, the local separation of the YAG layer was confirmed for three of the ten samples.

Incidentally, the ceramics material having the same property as described above can be acquired as follows. A molding or calcined body having a composition system of the alumina granulated powder with magnesium and yttrium contained therein. is prepared. Another molding or calcined body is laminated on surface of the prepared molding or calcined body. The laminating structure is sintered in an atmosphere containing hydrogen. Otherwise, the ceramics material according to the first or second embodiment, i.e. the sintered body of alumina with the YAG layer formed on the surface thereof is prepared as a base material. A powder layer, molding or calcined body of YAG is laminated again on the surface of the base material. The laminating structure is sintered in an atmosphere containing hydrogen.

Comparative Examples 1 and 2

In the first embodiment, alumina particles having an average particle diameter of 0.2 μm were used in place of the alumina particles having an average particle diameter of 0.3 μm and the calcined body was sintered at the temperature of 1760° C. (Comparative Example 1). The composition of Y(CH$_3$COO)$_3$.4H$_2$O was set for 20 weight parts instead of 1.5 weight parts in yttria, and the calcined body was sintered at the temperature of 1770° C. (Comparative Example 2). Two kinds of ceramics materials were prepared on the same condition as in the first embodiment except the above condition.

Under the same condition as in the first embodiment, these ceramics materials were subjected to various tests inclusive of identification of the property and thickness of the YAG layer formed on the surface of the alumina base material by the X-ray diffraction (XRD), measurement of the average particle diameter of the alumina crystal particles, confirmation of the changing tendency of the amount of YAG from the interior (lower portion) of the base material to the surface thereof (upper portion), measurement of the amount of YAG in the interior (central portion) of the base material, measurement of the breakage toughness and three-point bending strength, plasma exposure test, heat cycle test, etc.

In the case of the first comparative example, the following matters were confirmed. The YAG layer was not uniformly formed on the surface so that the exposed area of the alumina crystal particles is 60% in a ratio of the entire area. The average particle diameter of the alumina particle was 3 μm. The amount of YAG in the interior (central portion) of the base material was 1 weight %. The amount of YAG was changed gradually from the interior of the base material of alumina to the surface. The breakage toughness of 3.5

MPa.m$^{1/2}$ and the three-point bending strength of 350 MPa were measured. The local presence of portions of the etching rate of 10 by the plasma exposure test was confirmed. The heat cycle test could not be carried out.

On the other hand, in the case of the second comparative example, the following matters were confirmed. The surface was covered with the YAG layer having a thickness of 80–120 μm. The average particle diameter of the alumina crystal particles was 20 μm. The amount of YAG in the interior (central portion) of the base material was 8 weight %. The mount of YAG was changed gradually from the interior of the base material of alumina to the surface thereof. The breakage toughness of 3.5 MPa.m$^{1/2}$ and the three-point bending strength of 280 MPa were measured. The etching rate by the plasma exposure test was 1 or less. The heat cycle test of 100 times could be carried out.

This invention should not be limited to the embodiments described above, but can be changed in various modifications without departing from the scope and sprit of the invention. For example, the base material of alumina may be a sintered body containing alumina. Further, the kind of sintering aids to be added and its composition ratio can be optionally selected in accordance with the use and using purpose of the ceramics material.

In this inventions, a structure is adopted in which the base material is made of a sintered body of alumina with an excellent mechanical property such as bending strength and breakage toughness while the surface is covered with the YAG layer with excellent plasma-resistance. Such a structure cancels the occurrence of damage/breakage during the cleaning, and removes the fear of particle contamination.

Namely, this invention can suppress the increase in the production cost of a producing apparatus and semiconductor and also provides a ceramics material which efficiently contributes to the production/processing of the semiconductor with high performance and reliability without adversely affecting the quality and accuracy of the deposited film. Particularly, the structure in which a composite layer is interposed between the base material of alumina and the YAG layer exhibits excellent heat-cycle resistance so that it can be suitably applied to the application in which heating and cooling are repeated.

Further, this invention can provide, with high yield and in mass production, a ceramics material which has an excellent mechanical property such as bending strength and breakage toughness and excellent plasma-resistance and suitable to the apparatus for manufacturing semiconductor.

What is claimed is:

1. A ceramics material comprising a base material substantially made of a sintered body of alumina and a yttrium-aluminum-garnet(YAG) layer having a thickness of 2 μm or more which is formed on a surface of the base material.

2. A ceramics material according to claim 1 wherein the surface of the base material is covered with the YAG layer so that alumina crystalline particles in the sintered body of alumina are not exposed.

3. A ceramics material according to claim 1, wherein the YAG layer has a thickness of 150 μm or less.

4. A ceramics material according to claim 1, wherein the base material is a sintered body of alumina with an amount of YAG which increases gradually from the interior to the surface.

5. A ceramics material according to claim 1, wherein an amount of YAG within the sintered body of alumina is 5 weight % or less.

6. A ceramics material according to claim 1, wherein the alumina crystalline particles in the sintered body of alumina have an average crystalline diameter of 200 μm or less.

7. A method of producing a ceramics material according to claim 1, said method comprising the steps of:
preparing a raw powder in which alumina particles having an average particle diameter of 0.1–1.0μm are mixed with at least a magnesium compound of 0.01 –1 weight % in magnesia and an yttrium compound of 0.1–15 weight % in a term of yttria;
calcining a molding which is formed by molding said raw powder; and
heating the molding in an atmosphere containing a hydrogen gas to form YAG which is leached to the surface to deposit the YAG on the surface and sintering the molding.

8. A method of producing a ceramics material according to claim 7, wherein a solution including yttrium is added as a component of the raw powder after the molding has been calcined.

9. A method of producing a ceramics material according to claim 7, wherein a layer of YAG exude and deposited on the surface of the sintered molding is heated so that it is densified.

10. A method of producing a ceramics material according to claim 7, wherein a layer of YAG exuded to and deposited on the surface of the sintered molding is heated so that it is molten, and solidified again.

11. A method of producing a ceramics material according to claim 1, the method comprising laminating a powder layer, molding or a calcined body of YAG on a molding or a calcined body of alumina containing magnesium and yttrium and heating the laminate in an atmosphere of a hydrogen gas.

12. A method of producing a ceramics material according to claim 1, the method comprising stacking a powder layer, molding or a calcined body of YAG on the surface of a sintered body with a YAG layer deposited thereon and heating the stacked structure in an atmosphere of a hydrogen gas so that it is sintered.

13. A ceramics material according to claim 2, wherein the YAG layer has a thickness of 150 μm or less.

14. A ceramics material according to claim 2, wherein the base material is a sintered body of alumina with an amount of YAG which increases gradually from the interior to the surface.

15. A ceramics material according to claim 3, wherein the base material is a sintered body of alumina with an amount of YAG which increases gradually from the interior to the surface.

16. A ceramics material according to claim 2, wherein an amount of YAG within the sintered body of alumina is 5 weight % or less.

17. A ceramics material according to claim 3, wherein an amount of YAG within the sintered body of alumina is 5 weight % or less.

18. A ceramics material according to claim 2, wherein the alumina crystalline particles in the sintered body of alumina have an average crystalline diameter of 200 μm or less.

19. A ceramics material according to claim 3, wherein the alumina crystalline particles in the sintered body of alumina have an average crystalline diameter of 200 μm or less.

20. A method of producing a ceramics material according to claim 8, wherein a layer of YAG exuded and deposited on the surface of the sintered molding is heated so that it is densified.

21. A method of producing a ceramics material according to claim 8, wherein a layer of YAG exuded to and deposited on the surface of the sintered molding is heated so that it is molten, and solidified again.

* * * * *